No. 834,433. PATENTED OCT. 30, 1906.
J. G. & L. G. WILSON.
RECIPROCATING SHAFT FOR ROLLER SHUTTERS.
APPLICATION FILED FEB. 16, 1906.
2 SHEETS—SHEET 1.
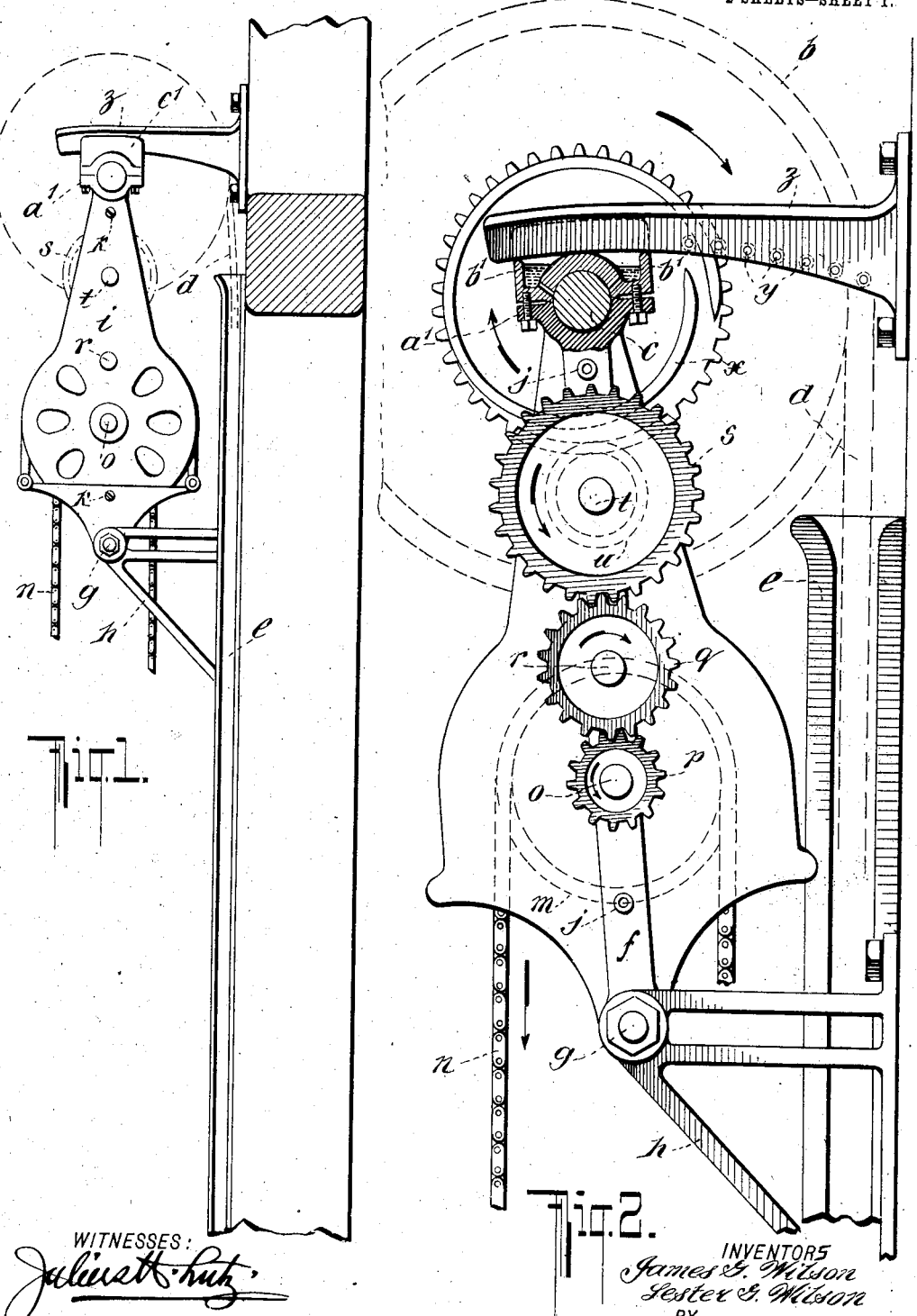
WITNESSES:
INVENTORS
James G. Wilson
Lester G. Wilson
BY
Briesen & Knauth
ATTORNEYS No. 834,433. PATENTED OCT. 30, 1906.
J. G. & L. G. WILSON.
RECIPROCATING SHAFT FOR ROLLER SHUTTERS.
APPLICATION FILED FEB. 16, 1906.
2 SHEETS—SHEET 2.
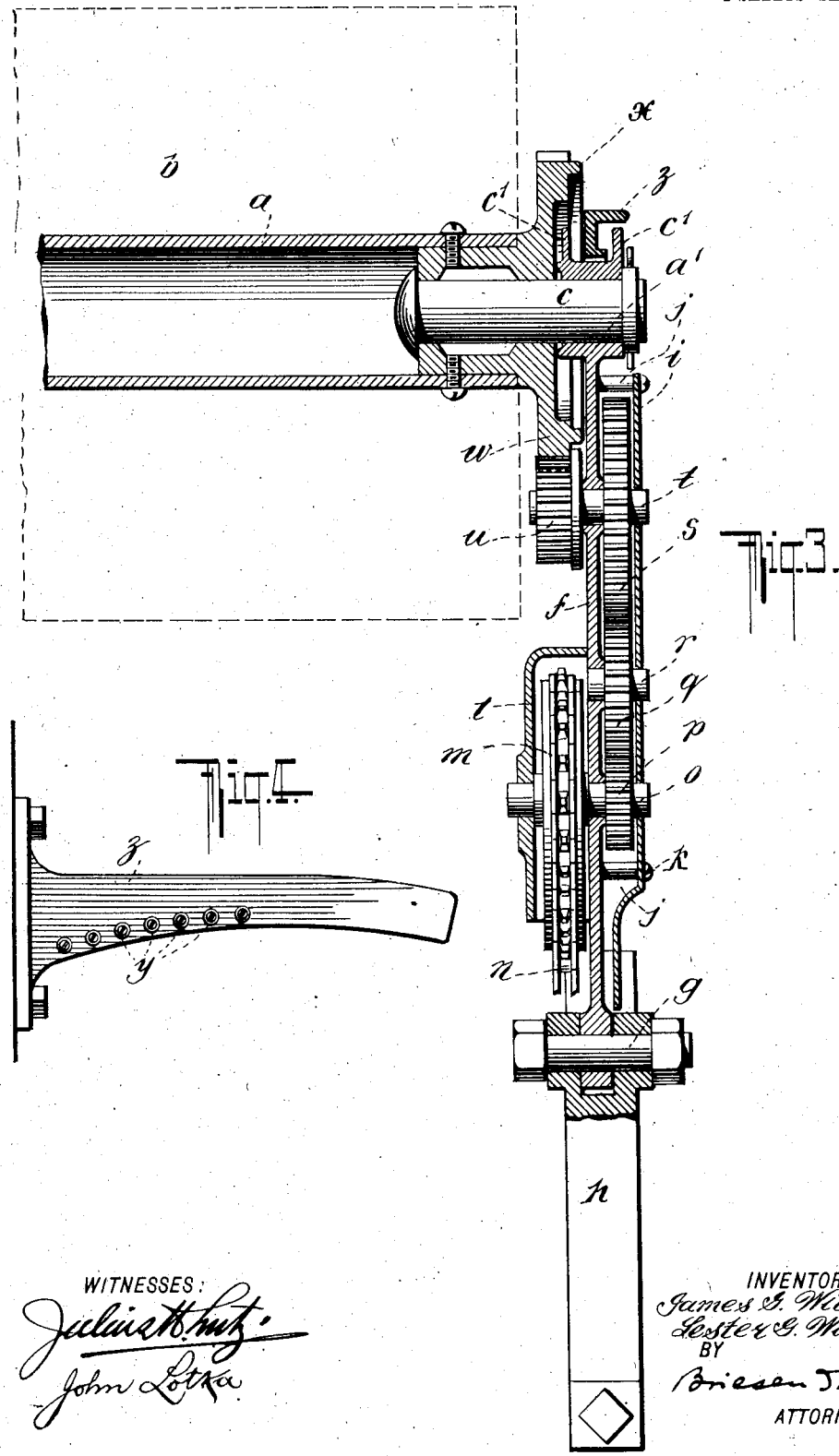
WITNESSES:
INVENTORS
James G. Wilson
Lester G. Wilson
BY
ATTORNEYS

UNITED STATES PATENT OFFICE.

JAMES G. WILSON AND LESTER G. WILSON, OF NEW YORK, N. Y.

RECIPROCATING SHAFT FOR ROLLER-SHUTTERS.

No. 834,433.      Specification of Letters Patent.      Patented Oct. 30, 1906.

Application filed February 16, 1906. Serial No. 301,434.

*To all whom it may concern:*

Be it known that we, JAMES GODFREY WILSON, a subject of the King of England, and LESTER GODFREY WILSON, a citizen of the United States, residents of the borough of Manhattan, city and State of New York, have invented new and useful Improvements in Reciprocating Shafts for Roller-Shutters, of which the following is a specification.

The object of our invention is to provide means for reciprocating a shaft which carries a roller-shutter, so that the shutter enters its grooves at an angle of one hundred and eighty degrees, thus avoiding dragging or unnecessary friction and leaving no opening for drafts, fire, or rain.

In the accompanying drawings, Figure 1 is an elevation of our device; Fig. 2, a vertical section through the same; Fig. 3, another section at right angles to the section shown in Fig. 2; and Fig. 4, an inside view of the guide-arm forming a part of our device, showing the antifriction-rollers.

As roller-shutters are generally constructed to-day the shaft on which they are wound is placed at such a distance from the wall or the grooves in which the shutter slides as to enable the entire shutter to be wound on the shaft. In other words, the distance between the shaft and the grooves or the doorway must be equal to the radius of the coil formed by the shutter when entirely wound up. As the shutter is lowered the unwound portion of the shutter forms substantially at all times a tangent to the circumference of the coil. As the coil becomes smaller with each revolution of the shaft the direction of the tangential line constantly changes, so that the shutter enters its groove at an angle, thus dragging on the edges of the groove and creating friction with the walls at the edges of the shutter and also increasing the work necessary for the operation of the shutter. Moreover, a constantly-widening opening is formed at the top of the doorway as the roller descends, which opening permits fire, draft, and rain to to enter the doorway.

Our device for obviating the difficulties attending the operation of roller-shutters as made at present consists, substantially, in mounting the shaft on a swinging arm so arranged as to permit the shaft to swing nearer the doorway as the coil unrolls, so as to enable the shutter to enter the grooves always in a vertical line, thus avoiding friction and also completely closing the doorway.

In the drawings, $a$ is a roller-shaft carrying the coiled roller-shutter $b$. The shaft is rotatably journaled, by means of a steel journal $c$, in the swinging arm, hereinafter to be described. This shaft is constructed along the general lines of the well-known shade-roller and contains a counterbalancing-spring. The entire shaft is not shown here, as its construction is so well known to those skilled in the art as not to necessitate any further description. The uncoiled portion of the shutter $d$, Figs. 1 and 2, slides in grooved guides $e$, mounted on either side of the doorway. The swinging arm $f$ is journaled at $g$ in the bracket $h$, so as to swing in a direction toward and away from the wall upon which the bracket $h$ is mounted.

In Fig. 1 the arm is provided with an ornamental and protective casing $i$, screwed down onto lugs $j\,j$, Fig. 3, by means of screws $k\,k$. The casing serves also as a bearing for journal-shafts, hereinafter referred to. A casing $l$, mounted on the arm, Fig. 3, incloses a sprocket-wheel $m$, operated by means of a chain $n$. This sprocket-wheel is carried by a journal-shaft $o$, mounted in the arm proper and the two casings $i$ and $l$. This shaft also carries rigidly connected with it a pinion $p$, which meshes with a gear-wheel $q$, carried by the shaft $r$, which in turn meshes with a pinion $s$, mounted on a shaft $t$. This shaft carries also a pinion $u$, which meshes with teeth on the periphery of the casting $w$, which casting is attached to the end of the roller-shaft. The purpose of this train of gearing is to transmit motion from the chain $n$ to the roller-shaft $a$.

The casting $w$ is provided on its face with a cast spiral $x$, which has a pitch equal to the thickness of the shutter. This spiral successively engages a series of teeth $y$, mounted on the inside of an arm $z$, attached to the wall or door-jamb. These teeth are shown in face view in Fig. 4 and are preferably provided with antifriction-rollers. They are shown in Fig. 3 in dotted lines to indicate that they are on the inside of the arm and are not visible from the side from which this view is taken. These teeth form together a curved rack the center of which coincides with the axis or pivot $g$ of the arms $f$.

The upper end of the arm $f$ is provided with a journal-box $a'$, the upper portion of which is provided with side walls $b'$ $c'$ to form an oil-cup. The walls $c'$ are oppositely located and are higher than the walls $b'$ and form guides within which the stationary arm $z$ is located.

The above-described device is provided in duplicate, one at each end of the shaft, with the exception that the actuating means are omitted in the second arm and the journal $c$ is replaced by a squared tension arranged as in the ordinary commercial shade-roller.

The operation of our device is as follows: When the roller-shutter is in its raised or coiled condition, the chain $n$ is actuated in such a manner as to turn the shaft $a$ against the tension of the counterbalancing-spring by means of the train of gearing $p$, $q$, $s$, $u$, and $w$. The shaft then turns in the direction of the arrow shown in Figs. 1 and 2 and the shutter unwinds, the unwound portion dropping down between the walls of the grooves $e$. As the shaft turns, the spiral $x$ turns with it, at each turn engaging a new tooth $y$, thus feeding the arm in a direction toward the doorway. As the pitch of the spiral and the distance between the centers of the pins $y$ are equal to the thickness of the roller-shutter, the arm $f$ and the shaft $a$ will be carried toward the doorway a distance equal to the thickness of the roller-shutter with each revolution of the shaft. As one thickness of shutter is unwound with each revolution of the shaft, the outside of the coil will always be equally distant from the doorway, thus insuring a vertical hang of the unwound portion of the shutter and a complete closure of the doorway.

Of course the device could be operated without the use of the spiral and pins by substituting some other spacing device; but in any event the shaft must be provided with a feed member, with which a purchase member must be adapted to coöperate. However, the device as shown is the most satisfactory embodiment of one device known to us, and other means for actuating the roller-shaft can be substituted for those shown without departing from the spirit of our invention.

We claim—

1. In a roller-shutter, swinging arms, a roller-shaft carried thereby, a stationary guide having individual members arranged in the arc of a circle whose center coincides with the axis about which the arms swing, and means on the roller-shaft, adapted to engage said members as the roller rotates and cause the arms to swing on their pivots.

2. In a roller-shutter swinging arms, a roller-shaft carried thereby, means governed by the rotation of the shaft, for causing the arms to swing in one direction or the other, as the shutter winds on or off the roller, and gearing carried by one of said arms to swing therewith and operatively connected with the shaft to turn the same.

3. In a roller-shutter, swinging arms, a roller-shaft carried thereby, a stationary rack curved about the pivot-axis of the arms as a center, and means on the roller-shaft, adapted to engage said rack and to cause the arms to swing about their axis in one direction or the other as the roller winds on or off the shaft.

4. In a roller-shutter, swinging arms, a roller-shaft carried thereby, a feed member carried by the shaft, and means adapted to coöperate with the feed member during the rotation of the shaft to swing the arms in such a manner that for each revolution the shaft will be carried laterally a distance corresponding to the thickness of the shutter.

5. In a roller-shutter the combination of a shaft carried by arms arranged to swing toward and away from the guide-grooves, and means for guiding the shaft, and means for controlling the oscillation of the arms, said means comprising a spiral mounted on the shaft and arranged to engage a series of teeth, the distance between the teeth and the pitch of the spiral being equal to the thickness of the roller-shutter.

6. In a roller-shutter the combination of a shaft carried by arms arranged to swing toward and away from the side grooves, a guide for the arms, means for controlling the oscillation of the arms, said means comprising a spiral mounted on the shaft, and pins mounted on the guide, the spiral being arranged to engage successively the pins on the guide, the distance between the pins and the pitch of the spiral being substantially equal to the thickness of the roller-shutter.

7. In a roller-shutter the combination of a shaft carried by arms arranged to swing toward and away from the guide-grooves, a guide for the arms, the ends of the shaft being mounted in journal-boxes carried by the ends of the arms, the upper part of the journal-box being provided with walls to form an oil-cup, two oppositely-located walls being higher than the others, to form guide-pieces adapted to coöperate with the guide.

8. In a roller-shutter the combination of a shaft carried by arms pivotally mounted in a bracket attached to the door-frame, the pivot being located below the roller-shaft, guides for the arms, a spiral mounted on the shaft to coöperate with pins on the guide so as to feed the shaft in the direction of the guide-grooves as the shutter unrolls, means located on the arms for transmitting motion to the shaft, and a counterbalance-spring located within the shaft.

In testimony whereof we have hereunto set our hands in the presence of two subscribing witnesses.

JAS. G. WILSON.
LESTER G. WILSON.

Witnesses to the signature of Jas. G. Wilson:
W. E. DUNCANSON,
JOHN A. KEHLENBECK.

Witnesses to the signature of Lester G. Wilson:
H. A. JOHNSON,
F. McMANUS.